United States Patent Office 2,945,113
Patented July 12, 1960

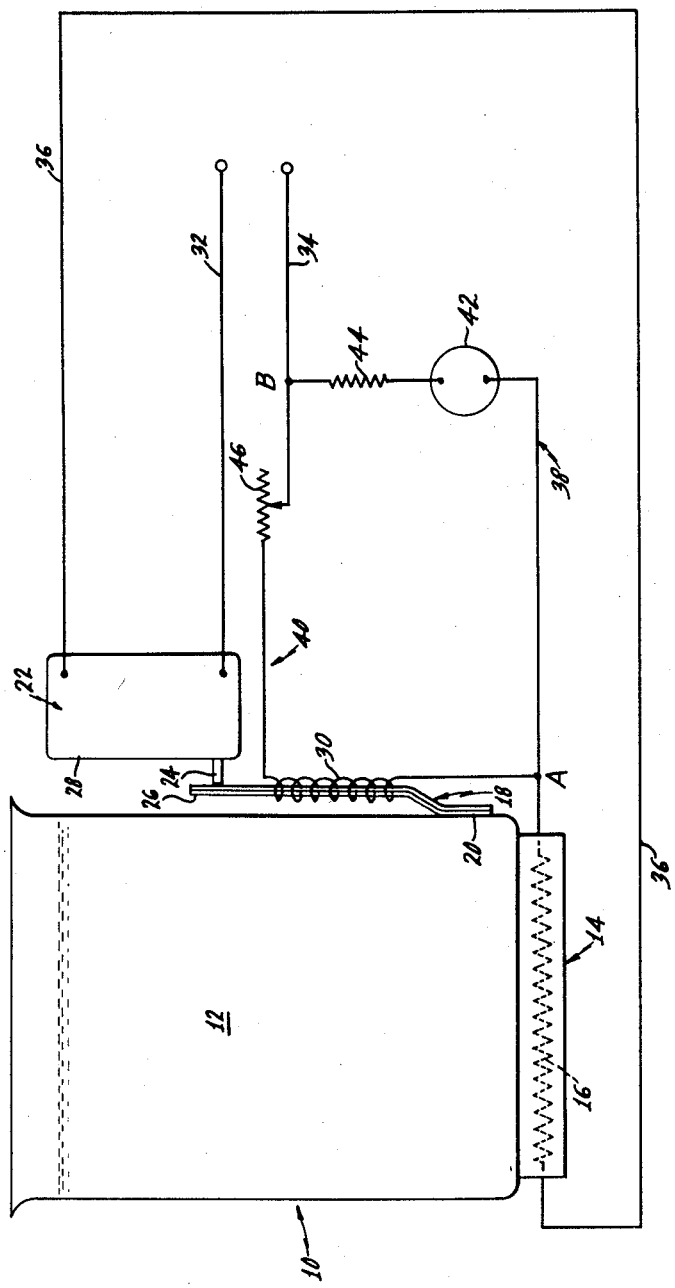

2,945,113

SENSITIVE THERMAL-CONTROL DEVICE

Milton H. Pelavin, Forest Hills, N.Y., assignor, by mesne assignments, to Technicon Instruments Corporation, Chauncey, N.Y., a corporation of New York Filed May 9, 1957, Ser. No. 658,143

5 Claims. (Cl. 219—20)

The present invention relates to heating receptacles with temperature control means therefor.

Normally, in order to maintain a heated substance in an electrical heating receptacle close to a predetermined temperature, it is the practice to provide said heating receptacle with a thermostatic control comprising a thermo-responsive member positioned in direct heat-exchange relation with the heating receptacle and operable in conjunction with a switch to make and break the circuit of the electric heater. However, it has been found that due to the relatively high heat inertia of the receptacle and its contents, there exists a thermal-lag which permits the temperature of the contents of the receptacle to substantially overshoot the predetermined temperature value set therefor.

It is therefore an object of the invention to provide improved temperature control means which is extremely sensitive and rapidly responsive to slight variations from a predetermined temperature of the heating receptacle and is quick-acting so as to be effective to maintain a substantially constant predetermined temperature.

Another object of the invention is to provide in a thermostatically controlled heating receptacle having a thermostat operable in conjunction with an "On"–"Off" power switch, a control heater coil having low thermal inertia characteristics in heating relation to said thermostat for accelerating the heating thereof when said heater coil is energized and for accelerating the cooling thereof when said heater coil is de-energized, thus increasing the sensitivity of the thermostatic control and substantially reducing or eliminating variations from a predetermined set temperature intended to be maintained under the control of said thermostat.

The above and other objects, features and advantages of this invention will be more fully understood from the following description considered in connection with the accompanying illustrative drawing.

The sole figure herein is a side view of the heating receptacle and a schematic showing of the electric heating and control circuit therefor.

Referring now to the drawing in detail, the heating receptacle 10 comprises the open top metal container 12 which is provided with an electric heater 14 consisting of suitable electrically insulated resistance wire 16 disposed in the lower portion of said heating receptacle. A thermostatic element 18, preferably in the form of a bimetallic strip, as illustrated, is positioned in direct heat-exchange relation with container 12, by securing one end of said thermostatic element 18 to the outer surface of container 12, being preferably spot welded thereto as at 20. Switch 22 is a normally-closed quick-acting switch, preferably a normally-closed "micro-switch" having the usual push-pin actuator 24, which when moved inwardly is operable to open the switch and thus interrupt the circuit of heater 14. Thermostatic element 18 has a part 26 which is flexibly movable toward and away from actuator pin 24, axially of pin 24, for respectively moving said actuator inwardly of switch casing 28 to open the switch and for releasing said pin actuator so that the switch can close by its own spring operation, as in the usual micro-switch or other spring closed switch. As spring operated switches of this type are well known a detailed description thereof is unnecessary. Thermostat 18 may be adjusted to operate at a desired temperature in any suitable way, preferably by the adjusting device shown in Gorham Patent 2,699,489, owned by the assignee of this application.

Pursuant to the present invention, an auxiliary heating element 30 having low heat-inertia characteristics is wrapped around thermostatic element 18 for imparting heat thereto when said auxiliary heating coil is energized. It will be understood that said auxiliary heating element 30 is electrically insulated from the thermostatic element 18. Heating coils which heat up and cool down rapidly in response to the electrical energizations and de-energization thereof are per se well known and readily available on the market.

Conductors 32 and 34 are adapted to be connected to a conventional power source. Supply conductor 32 is connected to one terminal of micro-switch 22, the other terminal of micro-switch 22 being connected in series with one terminal of receptacle heater 14 by means of conductor 36. The other terminal of heater 14 is connected to terminal A to which the control heater is also connected. Supply conductor 34 is connected to terminal B, and, as can readily be seen, there are two parallel branches 38 and 40 across terminals A and B. Branch 38 contains therein in series thermistor element 42 and resistor element 44. Branch 40 contains therein series control heater coil 30 and a variable resistor element 46. Thermistor 42 and resistor 44 act as a voltage regulator to maintain a constant non-varying voltage across control heater 30 in the branch circuit 40. Thermistor 42 has a negative temperature resistance slope portion on its characteristic curve, and its associated resistor 44 is a conventional resistor with a positive temperature coefficient and having a characteristic curve with a slope equal to that of thermistor element 42 but of opposite sign. When the thermistor 42 is operated on the negative resistance slope portion of its characteristic curve, an increase in current through said thermistor will decrease the voltage drop thereacross, while the same increase in current in resistor 44 in series therewith will increase the voltage drop across said resistor thus resulting in a fixed voltage being maintained across heater coil 30, though the current through the thermistor 42 and resistor 44 may vary due to fluctuations in the supply voltage. Consequently, for any given setting of variable resistor element 46 in branch 40, the current flowing through said branch will remain constant. It is further apparent therefore, that the heat produced by auxiliary heating coil 30, being a function of the current flowing therethrough, will remain a constant amount regardless of any possible fluctuations in the supply voltage. The particular amount of heat to be produced by auxiliary heating coil 30 may be regulated by variable resistor 46 in series therewith. As illustrated micro-switch 22 is in series with the line and when said switch is opened by thermostatic element 18 pursuant to the heating thereof, receptacle heater 14 and auxiliary heating coil 30 are de-energized.

Description of the operation of the device now follows herein.

Micro-switch 22 being normally closed, electrical heater 14 and auxiliary heating element 30 are both energized and thermostatic element 18 is heated both by the receptacle 12 and the auxiliary heating element 30. However, the heat of coil 30 is not sufficient by itself to heat the thermostat 18 to the extent necessary to open switch 22. When the temperature of the receptacle approaches the predetermined value at which it is desired to maintain the contents of the receptacle, the heat of coil 30 is added to the heat of the receptacle and anticipates the heating effect of the latter on thermostat 18 so that the thermal lag which would otherwise retard the operation of said thermostat to open the switch is, in effect, neutralized and the switch opens at the predetermined desired temperature. When the switch is opened, the heating coil is de-energized and cools rapidly, so that the thermostat is then subjected only to the residual heat of the receptacle and thus cools more rapidly than if it had been necessary to respond only to heat changes of the receptacle. Also, since the thermal lag of control heater coil 30 is much smaller than that of the receptacle and its contents, said coil will cool much faster, causing thermostatic element 18 likewise to cool much faster, and consequently actuating microswitch 22 much more quickly to turn the power on and thus re-energize heater 14 and auxiliary heating element 30.

Upon re-energizing heater 14 and auxiliary heating element 30, the latter heats up more quickly due to its relatively low heat inertia and again causes a faster heating of the thermostatic element 18 and consequently a quicker actuation of micro-switch 22 to turn off the power to both heaters. In effect, auxiliary heating element 30 anticipates the temperature change in the heating receptacle and, having a lower heat inertia than the receptacle and its contents, it heats up and cools off much more rapidly than said heating receptacle and the contents thereof.

In the use of the device according to the present invention the cycling rate, i.e., the "On" and "Off" operations of switch 22, is much more rapid than a similar device without the control heater coil, for example one cycle per minute as compared to one cycle per 15 minutes when the heating coil 30 is omitted; and variations from a preselected temperature have consequently been considerably reduced or practically eliminated. The frequency of cycling is dependent on the amount of heat put into the auxiliary heating coil and on the thermal inertia of the thermostatic element and the associated auxiliary heating element which is considerably less than that of the rest of the system. As stated before, the amount of heat put into the auxiliary heating device may be varied by means of variable resistor 46 in series with auxiliary heating element. But for any given setting of variable resistor 46, the current through auxiliary heating element 30, and the heat produced thereby, remain constant due to the voltage regulation feature provided by thermistor element 42 in series with its associated resistor element 44.

Thus it is seen that the herein disclosed heating receptacle and the temperature control means therefor are well adapted to accomplish the objects of the present invention, said control means being extremely sensitive and quick acting and thus maintaining variations from a predetermined temperature of the heating receptacle down to a minimum, in a manner not heretofore known or used.

While I have shown and described the preferred embodiments of my invention, it will be understood that various changes may be made in the present invention without departing from the underlying idea or principles of the invention within the scope of the appended claims.

Having thus described my invention, what I claim and desire to secure by Letters Patent is:

1. In a heating receptacle provided with an electric heater, temperature control means therefor comprising a thermostatic element in heat exchange relation with said receptacle, auxiliary heating means having lower heating capacity than said heating receptacle in heat exchange relation with said thermostatic element, means connected to said auxiliary heating means for maintaining the heat produced thereby constant, and switch means operable under the control of said thermostatic element for closing and opening the circuits of said heater and said auxiliary heating means in unison, whereby to accelerate the heating and cooling of said thermostatic element to cause a relatively high frequency cyclic actuation of said switch means and thus reduce temperature variations of said receptacle from a predetermined value set therefor.

2. In a heating receptacle provided with an electric heater, temperature control means therefor comprising a thermostatic element in heat exchange relation with said receptacle, a current carrying coil wrapped around said thermostatic element for imparting heat thereto, means including a thermistor for maintaining the current through said coil constant when said coil is energized, and switch means operable under the control of said thermostatic element for controlling the energization and de-energization of said heater and said coil in unison whereby the temperature of the heating receptacle and the contents thereof is maintained at or close to a predetermined temperature set therefor.

3. A device for maintaining the temperature of a heated bath at or close to a predetermined value, comprising, a receptacle for said bath, an electric heater in heat exchange relation with said receptacle for heating said bath, a thermostatic element in heat exchange relation with said receptacle, switch means operable under the control of said thermostatic element for opening and closing the circuit of said heater in accordance with the temperature of said thermostatic element, a current carrying coil having low heat inertia characteristics wrapped around said thermostatic element for imparting heat thereto when said coil is energized, the circuit of said coil being energized in unison with said heater circuit, a variable resistor in series with said coil for varying the current flowing therethrough, and voltage regulation means connected across said coil and variable resistor for maintaining a constant voltage across said coil and resistor, said coil heating up and cooling off more rapidly than said bath when energized and de-energized, respectively, to cause said thermostatic element to actuate said switch at a faster rate and thus reduce temperature variations of said bath from said predetermined value.

4. In a temperature control device, thermostatically actuated means operable under the control of heat from a source the temperature of which is to be controlled by said device, and an electric control-heater of less heating capacity than said source and having less thermal inertia than the latter operable upon said thermostatically operated means for accelerating the operation thereof under the control of the heat of said first mentioned source, a voltage regulated circuit for applying a constant voltage to said electric control-heater, and switch means included in said thermostatically operated means for disconnecting said electric heater from said circuit for de-energizing the latter when said first source is at a predetermined temperature and for re-connecting said electric heater to said circuit for energizing said heater when the temperature of said first source drops below a predetermined temperature.

5. In a temperature control device for an electric heater, switching means for connecting said heater to a source of energizing current and for disconnecting said heater therefrom, thermostat means for controlling the actuation of said switching means operatively responsive to the heat generated by said electric heater, electrical heating means for said thermostatic means operable thereon independently of the heat generated by said heater for accelerating the operation of said thermostat means under the control of said heat, said thermostat means being operable to energize and de-energize said electrical heating means therefor, and means for operating said electrical heating means at a constant current value independently of any fluctuations in the supply voltage therefor.

References Cited in the file of this patent

UNITED STATES PATENTS 2,236,402    Gomersall _____ Mar. 25, 1941

(Other references on following page)

UNITED STATES PATENTS

| | | |
|---|---|---|
| 2,339,635 | Hall | Jan. 18, 1944 |
| 2,367,985 | Weeks | Jan. 23, 1945 |
| 2,428,525 | Osterheld | Oct. 7, 1947 |
| 2,448,289 | Anderson | Aug. 31, 1948 |
| 2,556,065 | Callender | June 5, 1951 |
| 2,567,756 | Amsler | Sept. 11, 1951 |
| 2,579,926 | Johnson | Dec. 25, 1951 |
| 2,611,850 | Walton | Sept. 23, 1952 |
| 2,649,530 | Dietz | Aug. 18, 1953 |
| 2,727,129 | Davis | Dec. 13, 1955 |
| 2,762,885 | Foster | Sept. 11, 1956 |
| 2,801,317 | Goldmuntz et al. | July 30, 1957 |
| 2,816,203 | Weeks | Dec. 10, 1957 |

FOREIGN PATENTS

| | | |
|---|---|---|
| 221,480 | Great Britain | Feb. 19, 1925 |